United States Patent
Lechner et al.

(10) Patent No.: US 10,775,209 B2
(45) Date of Patent: Sep. 15, 2020

(54) CONTROL CIRCUIT AND METHOD FOR CHECKING THE PLAUSIBILITY OF A ROTOR POSITION ANGLE

(71) Applicant: Robert Bosch GmbH, Stuttgart (DE)

(72) Inventors: Benjamin Lechner, Neuhausen (DE); Daniel Zirkel, Wiernsheim-Serres (DE); Daniel Raichle, Vaihingen (DE); Michael Ungermann, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 15/737,384

(22) PCT Filed: Jun. 7, 2016

(86) PCT No.: PCT/EP2016/062834
§ 371 (c)(1),
(2) Date: Dec. 18, 2017

(87) PCT Pub. No.: WO2016/202625
PCT Pub. Date: Dec. 22, 2016

(65) Prior Publication Data
US 2018/0180454 A1    Jun. 28, 2018

(30) Foreign Application Priority Data

Jun. 18, 2015  (DE) .................. 10 2015 211 194

(51) Int. Cl.
*G01D 18/00*  (2006.01)
*H02P 6/34*  (2016.01)
*G01D 5/00*  (2006.01)

(52) U.S. Cl.
CPC .............. *G01D 18/00* (2013.01); *G01D 5/00* (2013.01); *H02P 6/34* (2016.02)

(58) Field of Classification Search
CPC .................................................. G01D 18/00
(Continued)

(56) References Cited

U.S. PATENT DOCUMENTS

2007/0289395 A1* 12/2007 Hirzmann ............ G01D 5/3473
73/865.9
2011/0050137 A1*  3/2011 Imura ................. H02P 21/0003
318/400.15
(Continued)

FOREIGN PATENT DOCUMENTS

CN    101651442 A    2/2010
CN    101924510 A    12/2010
(Continued)

OTHER PUBLICATIONS

International Search Report for Application No. PCT/EP2016/062834 dated Jul. 19, 2016 (English Translation, 3 pages).
(Continued)

*Primary Examiner* — Ricky Ngon
(74) *Attorney, Agent, or Firm* — Michael Best & Friedrich LLP (57) ABSTRACT

The present invention provides a control circuit (10; 110; 210; 310) and a method for checking the plausibility of a rotor position angle. The control circuit is designed with: a rotor position angle determination device (12) for determining a first rotor position angle, $\varphi(t_k)$, at a first time, $t_k$, and at least one second rotor position angle, $\varphi(t_{k-1})$, at a second time, $\varphi_{k-1}$, before the first time, $t_k$; a computing device (14; 114; 214; 314) for determining a rotor position angle, $_{mod}(t_k)$, to be expected at the first time, $t_k$, from a computational model of the computing device (14; 114; 214; 314) using at least the second rotor position angle, $\varphi(t_{k-1})$; and a plausibility-checking device (16) for outputting a signal (51) which indicates the determined first rotor position angle, $\varphi(t_k)$, as plausible if an amount of a difference between the rotor position angle, $_{mod}(t_k)$, to be expected and the determined first rotor position angle, $\varphi(t_k)$, does not exceed a predetermined threshold value.

12 Claims, 4 Drawing Sheets

(58) Field of Classification Search
USPC .......................................................... 702/116
See application file for complete search history.

(56) References Cited

U.S. PATENT DOCUMENTS

| | | | | |
|---|---|---|---|---|
| 2014/0026681 | A1* | 1/2014 | Kopken | G01L 3/10 73/862.325 |
| 2014/0055126 | A1* | 2/2014 | Seeley | H02P 9/02 324/207.2 |
| 2014/0142782 | A1 | 5/2014 | Fu et al. | |
| 2014/0148948 | A1* | 5/2014 | Hagenauer | G01D 5/2073 700/245 |
| 2015/0151784 | A1* | 6/2015 | Moretti | B62D 15/024 701/41 |
| 2015/0158496 | A1* | 6/2015 | Cassar | B60W 40/10 702/150 |
| 2015/0177297 | A1* | 6/2015 | Schwarzkopf | H02P 6/182 702/66 |

FOREIGN PATENT DOCUMENTS

| | | |
|---|---|---|
| CN | 103439655 A | 12/2013 |
| CN | 103650326 A | 3/2014 |
| CN | 103828224 A | 5/2014 |
| CN | 104132670 A | 11/2014 |
| DE | 102011078583 | 1/2013 |
| DE | 102011079116 | 1/2013 |
| DE | 102012202772 | 8/2013 |
| DE | 102013204194 | 9/2014 |
| WO | 2006039884 | 4/2006 |

OTHER PUBLICATIONS

Luenberger, D., "An introduction to observers", IEEE Transactions on Automatic Control, Dec. 1, 1971, pp. 596-602, XP055287125.

* cited by examiner

CONTROL CIRCUIT AND METHOD FOR CHECKING THE PLAUSIBILITY OF A ROTOR POSITION ANGLE

BACKGROUND OF THE INVENTION

The present invention relates to a control circuit and method for checking the plausibility of a rotor position angle, in particular a rotor position angle which was determined by a rotor position sensor, which determines a speed compensated raw angle. The rotor position angle relates particularly to an angle at which a rotor of a synchronous machine or an asynchronous machine is aligned. The synchronous machine can, for example, relate to a permanently excited or an electrically excited synchronous machine.

The knowledge of the rotor position angle is necessary for controlling permanently excited synchronous machines and electrically excited synchronous machines, as said machines are used in hybrid and electric vehicles. This is also denoted in short as rotor angle or angle of rotation and frequently has the mathematical symbol $\varphi_{e1}$. In order to determine the rotor position angle, different types of sensors are known, e.g. digital angle sensors, resolvers, or sensors on the basis of the eddy current effect.

The German patent application DE 10 2011 078 583 A1 discloses, for example, an evaluation of resolver sensor signals in a vehicle. To this end, a resolver records a rotational movement of a rotor, and a processor element processes the sinusoidal or respectively cosine output signals of the resolver.

A plausibility check of the determined rotor position angle is desirable due to the importance that is attributed the rotor position angle.

SUMMARY OF THE INVENTION

The present invention discloses a control circuit and a method.

According to that, a control circuit for checking the plausibility of a rotor position is provided, comprising: a rotor position angle determination device for determining a first rotor position angle, $\varphi(t_k)$, at a first time, $t_k$, in particular from acquired first measurement variables, and at least one second rotor position angle $\varphi(t_{k-1})$, at a second time $t_{k-1}$, before the first time $t_k$, in particular from acquired second measurement values; a computing device for determining a rotor position angle $\varphi_{mod}(t_k)$ to be expected at a first time, $t_k$, from a computational model of the computing device using at least the second rotor position angle, $\varphi(t_{k-1})$; and a plausibility-checking device for outputting a signal which indicates the determined first rotor position angle, $\varphi(t_k)$, as plausible if an amount of a difference between the rotor position angle, $\varphi$ mod($t_k$), to be expected and the determined first rotor position angle, $\varphi(t_k)$, does not exceed a predetermined threshold value.

The rotor angle to be expected can also be denoted as a prognosis or estimation for the first rotor angle to be determined.

The invention furthermore provides a method for checking the plausibility of a rotor position angle, comprising the steps: determining a first rotor position angle, $\varphi(t_k)$, at a first time, $t_k$, in particular from acquired first measurement variables; determining at least one second rotor position angle, $\varphi(t_{k-1})$, at a second time $t_{k-1}$, before the first time, $t_k$, in particular from acquired second measurement values; determining a rotor position angle $\varphi_{mod}(t_k)$ to be expected at a first time, $t_k$, from a computational model using at least the second rotor position angle, $\varphi(t_{k-1})$; and outputting a signal which indicates the determined first rotor position angle, $\varphi(t_k)$, as plausible if an amount of a difference between the rotor position angle, $\varphi_{mod}(t_k)$, to be expected and the determined first rotor position angle, $\varphi(t_k)$, does not exceed a predetermined threshold value.

The determining of a—first, second or third—rotor position angle can particularly comprise an acquisition of measured values and a calculation of the rotor position angle on the basis of the acquired measured values or of said values themselves. Exemplary measured values are, for example, time, a magnetic field, an electrical field, a voltage, a resistance or something similar.

It should be understood that the method according to the invention can be continuously carried out. That means that, after first carrying out the method, wherein the determined first rotor position angle was checked for plausibility at the first time, in order to check for plausibility of a fourth rotor position angle at a fourth time, the fourth time moves to the position of the first time and the first time moves to the position of the second time in the method and continually in the same manner for each further performance of the method. The same is true analogously for the control circuit according to the invention.

A plausibility check of the rotor position angle is particularly to be understood as an assessment of the rotor position angle as plausible, i.e. as sufficiently believable or acceptable.

In a positive case scenario, i.e. when the rotor position angle to be expected at the first time correlates with the determined first rotor position angle, the amount of the difference between these two values is zero. Thus, in a positive case, the distance of this amount to the predetermined threshold value, up to which the rotor position angle shall be indicated as plausible, is at a maximum. Missed faults and false alarms during the plausibility check of the rotor position angle, i.e. faulty indicating of an incorrectly determined rotor position angle as plausible as well as faulty indicating of a correctly determined rotor position angle as implausible, can thus be reduced or eliminated.

The determined rotor position angle can advantageously be based on acquired measured values, said rotor position angle having been preprocessed and/or filtered, for example, by means of a phase-locked loop and/or a state variable filter for obtaining the rotor position angle. During the plausibility check of the rotor position angle, the dynamic behavior of the preprocessing, for example by means of the phase-locked loop or the state variable filter, is consequently likewise checked for plausibility. A rotor position angle indicated to not be plausible or respectively a rotor position angle indicated as implausible can particularly suggest an unlocking, i.e. a departure from a resting position, of the phase-locked loop or of the state variable filter. Hence, the indicating of the rotor position angle as plausible or not plausible can correspond to a control difference of the state variable filter.

A phase-locked loop also designated as PLL is an electronic circuit arrangement which influences the phase position and consequently in a coherent manner the frequency of a variable oscillator via a closed control circuit such that the phase deviation between an external reference signal and the oscillator or a signal derived therefrom is as constant as possible.

In addition, the control circuit according to the invention and the method according to the invention are significantly less susceptible to noise and break down than conventional control circuits and methods from the prior art.

Advantageous embodiments and modifications ensue from the dependent claims as well as from the description with reference to the figures in the drawings.

According to an advantageous modification, the rotor position angle determination device is designed for determining a third rotor position angle $\varphi(t_{k-2})$ at a third time $t_{k-2}$, before the second time $t_{k-1}$, and the computing device is designed for determining the rotor position angle $\varphi_{mod}(t_k)$ to be expected at the first time $t_k$ from the computational model using the second rotor position angle $\varphi(t_{k-1})$ and the third rotor position angle $\varphi(t_{k-2})$. Thus, an enlarged amount of values can be taken into account for determining the rotor position to be expected, whereby the accuracy of the determination can improve.

According to another advantageous modification, the computational model of the computing device is configured in such a way that the determining of the rotor position angle $\varphi_{mod}(t_k)$ to be expected at a first time, $t_k$, is based on the computational model that is based on a difference between the second rotor position angle $\varphi(t_{k-1})$ and the third rotor position angle $\varphi(t_{k-2})$ divided by a difference between the second time $t_{k-1}$ and the third time $t_{k-2}$-multiplied by a difference between the first time $t_k$ and the second time $k_m$. The determining of said rotor position angle $\varphi_{mod}(t_k)$ is particularly based on a sum of said difference and the determined second rotor position angle. Hence, the rotor position angle to be expected can be determined more accurately.

According to a further advantageous modification, the computational model of the computing device comprises a kinematical model of a powertrain within a Luenberger monitor. By using additional system variables, such as, for example a torque, a quality of the rotor position angle $\varphi_{mod}(t_k)$ to be expected and determined by means of the computational model can be further improved because changes in the rotational frequency and/or the reason therefore can also be taken into account in this case.

According to a further advantageous modification, the rotor position angles, particularly the first, second and the third rotor position angle are determined from acquired measured variables using a state variable filter and/or a phase-locked loop. The state variable filter can be designed to filter angle signals, which indicate a determined first, second or third rotor position angle, comprising a PTn member of the nth order and based on state variables.

BRIEF DESCRIPTION OF THE DRAWINGS

The present invention is explained below in detail using the exemplary embodiments depicted in the schematic figures in the drawings. In the drawings.

DETAILED DESCRIPTION

In all figures, identical or functionally identical elements and devices—as long as nothing else is specified—are provided with the same reference signs. The numbering of steps of the method is for clarity and is particularly not—so long that nothing else is specified—a certain temporal order. In particular, a plurality of steps of the method can also be carried out at the same time.

Figure 1:
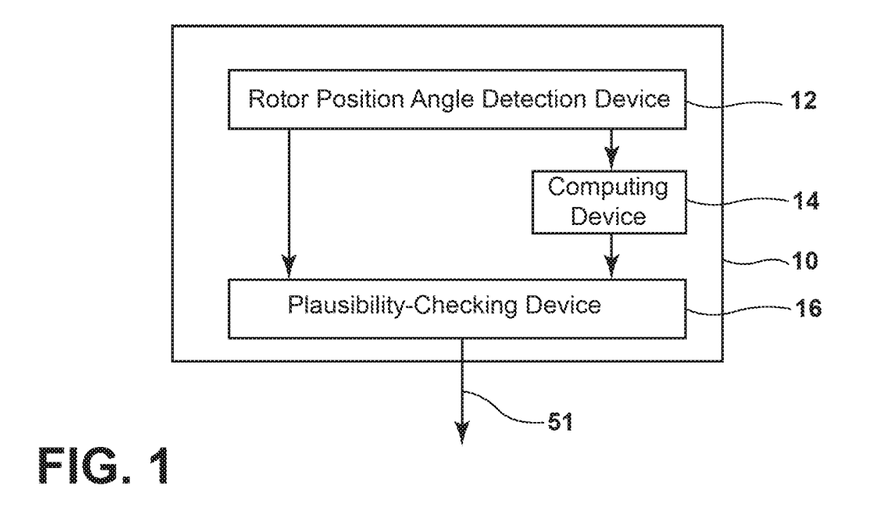
FIG. 1 shows a schematic block diagram for explaining a control circuit according to one embodiment of the present invention.

FIG. 1 shows a schematic block diagram for explaining a control circuit 10 according to one embodiment of the present invention.

The control circuit 10 comprises a rotor position angle detection device 12, by means of which a first rotor position angle $\varphi(t_k)$ at a first time, $t_k$, and at least one second rotor position angle $\varphi(t_k-1)$ at a second time, $t_{k-1}$, can be determined. An arbitrary number of rotor position angles can preferably be determined consecutively by means of the rotor position angle detection device 12. The determined rotor position angles can be stored in the rotor position angle detection device 12 and/or in an optional storage device of the control circuit 10.

In the present example, times are numbered by the index "k" of the temporal series, so that the time $t_{k-1}$ lies before the first time $t_k$, which in turn lies before a time $t_{k+1}$ and so on. The points in time $t_k$, $t_{k-1}$, $t_{k+1}$ etc. lie preferably apart from one another by a temporal duration, which is exactly equal to a minimum temporal duration or an integral multiple thereof, said minimum temporal duration lying according to the rotor position detection device between two determinations of a rotor position angle. In other words, the time is preferably divided up into such small time intervals between the points in time $t_k$ as the rotor position angle detection device can resolve. Different rotor position angles are characterized by the different points in time, at which said rotor position angles were determined. The rotor position angle detection device 12 can, for example, be designed as a resolver or as a sensor on the basis of the eddy current effect.

The control circuit 10 furthermore comprises a computing device 14, by means of which a rotor position angle $\varphi_{mod}(t_k)$ to be expected at a first time $t_k$ can be determined from a computational model of the computing device using at least the second rotor position angle $\varphi(t_{k-1})$. In a simple case, the computational model can be configured in such a way that the rotor position angle $\varphi_{mod}(t_k)$ to be expected at the first time $t_k$ exactly corresponds to the second rotor position angle $\varphi(t_{k-1})$ which is the temporally directly preceding rotor position angle determined.

The control circuit 10 furthermore comprises a plausibility-checking device 16, by means of which a signal 51 can be outputted, which indicates the determined first rotor position angle $\varphi(t_k)$ as plausible if an amount of a difference between the rotor position angle $\varphi_{mod}(t_k)$ to be expected and the determined first rotor position angle $\varphi(t_k)$ does not exceed a predetermined threshold value S.

That means the signal 51 is outputted by the plausibility-checking device 16, in the event that $|\varphi(tk)-\varphi(tk-1)|<S|$.

Figure 2:
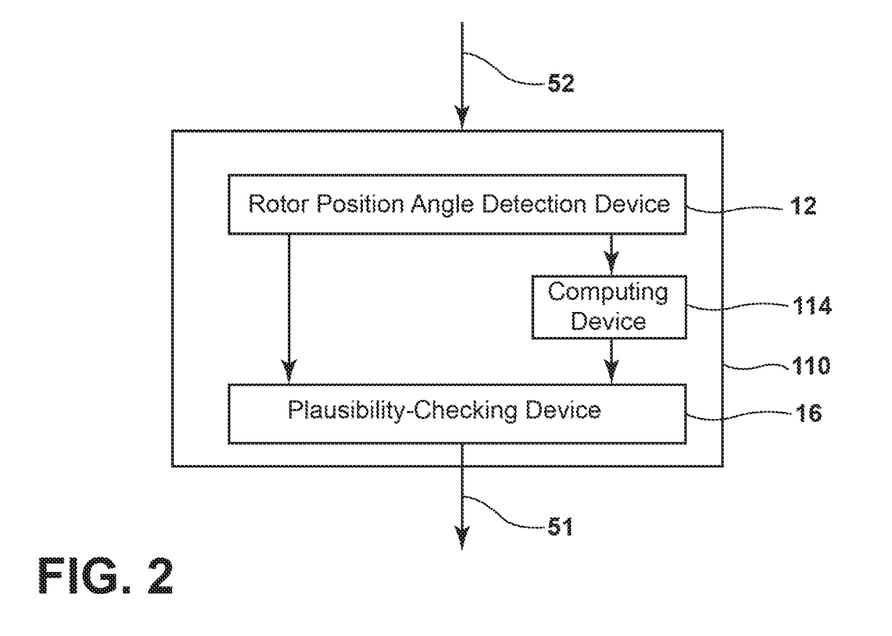
FIG. 2 shows a schematic block diagram for explaining a control circuit according to a further embodiment of the present invention.

FIG. 2 shows a schematic block diagram for explaining a control circuit 110 according to a further embodiment of the present invention.

The control circuit 110 is a variant of the control circuit 10 and differs from the same by the configuration of the computing device 114 of the control circuit 110.

In the case of the control circuit 110, the rotor position angle determination device 12 is designed to determine at least one third rotor position angle $\varphi(t_{k-2})$ at a third time $t_{k-2}$ before the second time $t_{k-1}$. The computing device 114 is designed for determining the rotor position angle $\varphi_{mod}(t_k)$ to be expected at the first time, $t_k$, from the computation model using the second rotor position angle $\varphi(t_{k-1})$ and the third rotor position angle $\varphi(t_{k-2})$.

The computation model of the computing device 14 is configured in such a way that the determining of the rotor position angle $\varphi_{mod}(t_k)$ to be expected from the computation model is based on a difference between the second rotor position angle $\varphi(t_{k-1})$ and the third rotor position angle $\varphi(t_{k-2})$, divided by a difference between the second time, $t_{k-1}$, and the third time, $t_{k-2}$, multiplied by a difference between the first time $t_k$ and the second time $t_{k-1}$.

According to the computation model of the computing device 14, as the rotor position angle $\varphi_{mod}(t_k)$ to be expected at the first time, a sum of the aforementioned difference between the determined second rotor position angle $\varphi(t_{k-1})$ and the determined third rotor position angle $\varphi(t_{k-2})$, divided by a difference between the second time, $t_{k-1}$, and the third time, $t_{k-2}$, multiplied by a difference between the first time, $t_k$, and the second time, $t_{k-1}$, is particularly formed as the first summand. The determined second rotor position angle $\varphi(t_{k-1})$ is likewise formed as the second summand.

That means that:

$$\varphi_{mod}(t_k) = \varphi(t_{k-1}) + \frac{\varphi(tk-1) - \varphi(tk-2)}{tk-1-tk-2}(t_k - t_{k-1}).$$

Thus, the signal 51 is outputted by the plausibility-checking device if:

$$\left|\varphi(tk) - \varphi(tk-1) - \frac{\varphi(tk-1) - \varphi(tk-2)}{tk-1-tk-2}(tk-tk-1)\right| < S$$

Figure 3:
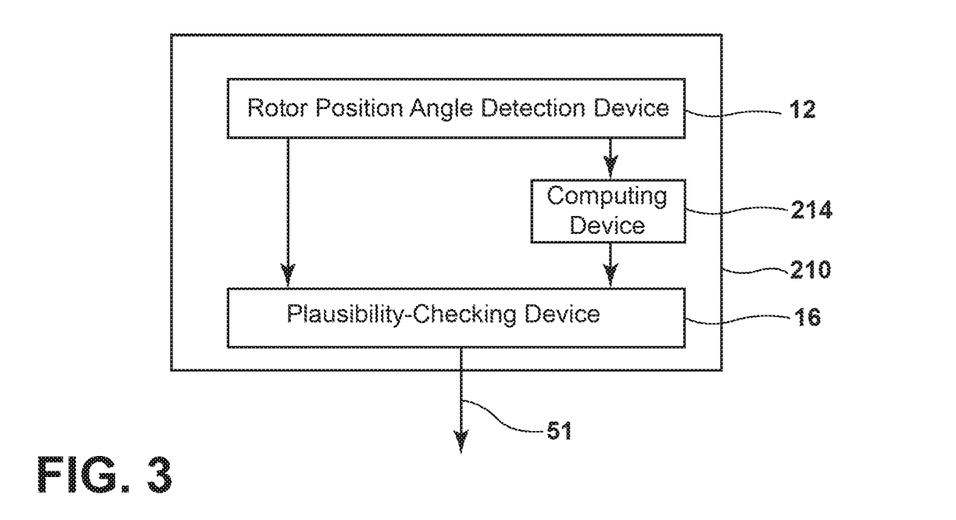
FIG. 3 shows a schematic block diagram for explaining a control circuit according to a further embodiment of the present invention.

FIG. 3 shows a schematic block diagram for explaining a control circuit 210 according to a further embodiment of the present invention.

The control circuit 210 is a variant of the control circuit 10 and differs from the latter in the configuration of the computing device 214 of the control circuit 210. The computing device 214 of the control circuit 210 is configured in such a way that the computation model of the computing device 214 comprises a kinematical model of a powertrain within a Luneberger monitor. The powertrain is part of a vehicle which comprises the rotor, the rotor position angle of which is to be determined and checked for plausibility.

Figure 4:
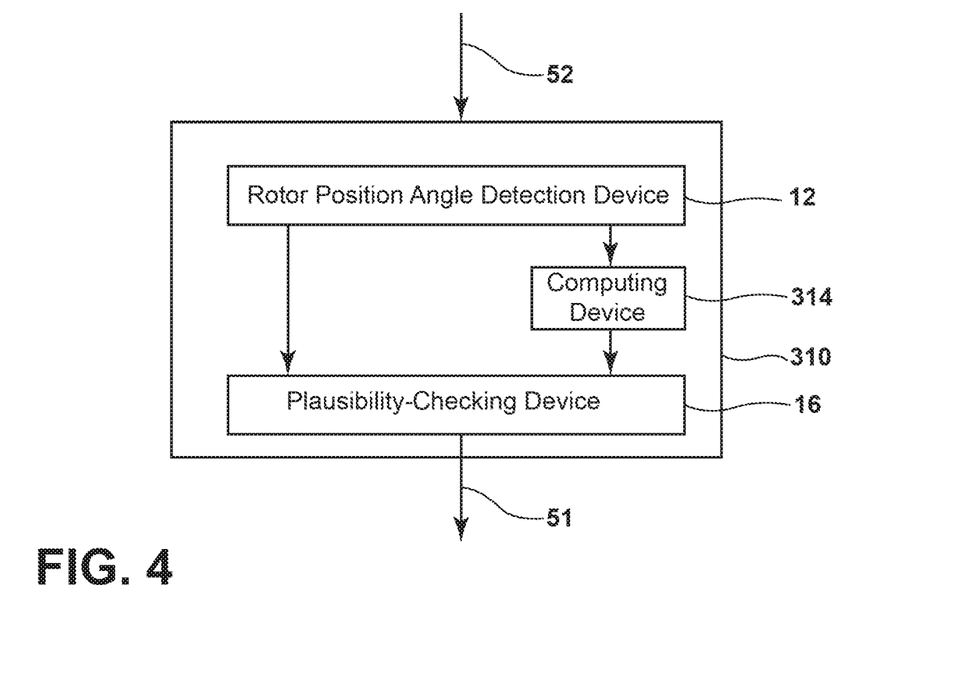
FIG. 4 shows a schematic block diagram for explaining a control circuit according to a further embodiment of the present invention.

FIG. 4 shows as schematic block diagram for explaining as control circuit 310 according to a further embodiment of the present invention.

The control circuit 310 is a variant of the control circuit 10 and differs from the latter by the configuration of the computing device 314 of the control circuit 310. The computing device 314 is designed to determine the rotor position angle $\varphi_{mod}(t_k)$ to be expected at the first time $t_k$ with the help of a sample value from the past, i.e. said sample value being the second, third etc. rotor position angle $\varphi(t_{k-1})$, $\varphi(t_{k-2})$. The computing device 314 is designed to use a state variable filter, in particular as in reference to FIG. 8, which is explained below.

Figure 5:
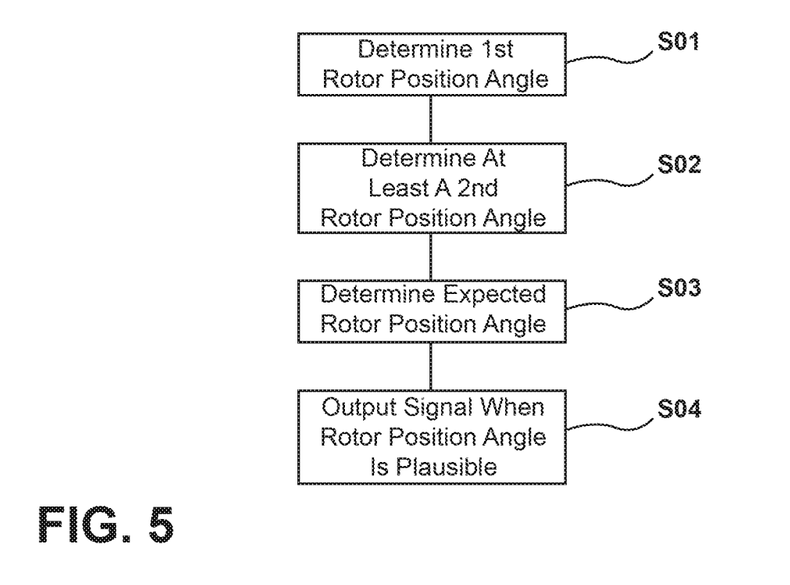
FIG. 5 shows a schematic flow diagram for explaining a method for checking the plausibility of a rotor position angle according to still a further embodiment of the present invention.

FIG. 5 shows a schematic flow diagram for explaining a method for checking the plausibility of a rotor position angle according to yet a further embodiment of the present invention. Reference should be made particularly to the explanations to FIG. 1 for an explanation of the reference signs of the different times $t_{k-1}$, $t_k$, $t_{k+1}$ etc.

The method according to FIG. 5 is particularly suitable to be carried out by means of a control circuit according to the invention, in particular the control circuit 10, and can be adapted in reference to the control circuit according to the invention to all of the described variants and modifications, in particular to control circuits 10, 110, 210 and 310.

In a step S01, a first rotor position angle $\varphi(t_k)$ is determined at a first time $t_k$. In step S02, at least a second rotor position angle $\varphi(t_k)$ is determined at a second time $t_{k-1}$ before the first time $t_k$. In a step S03, a rotor position angle $\varphi_{mod}(t_k)$ to be expected at the first time $t_k$ is determined from a computational model using at least the second rotor position angle $\varphi(t_{k-1})$. In step S04, in the event an amount of a difference between the rotor position angle $\varphi_{mod}(t_k)$ to be expected and the determined first rotor position angle $\varphi(t_k)$ does not exceed a predetermined threshold value S, a signal 51 is outputted which indicates the determined first rotor position angle $\varphi(t_k)$ as plausible.

Figure 6:
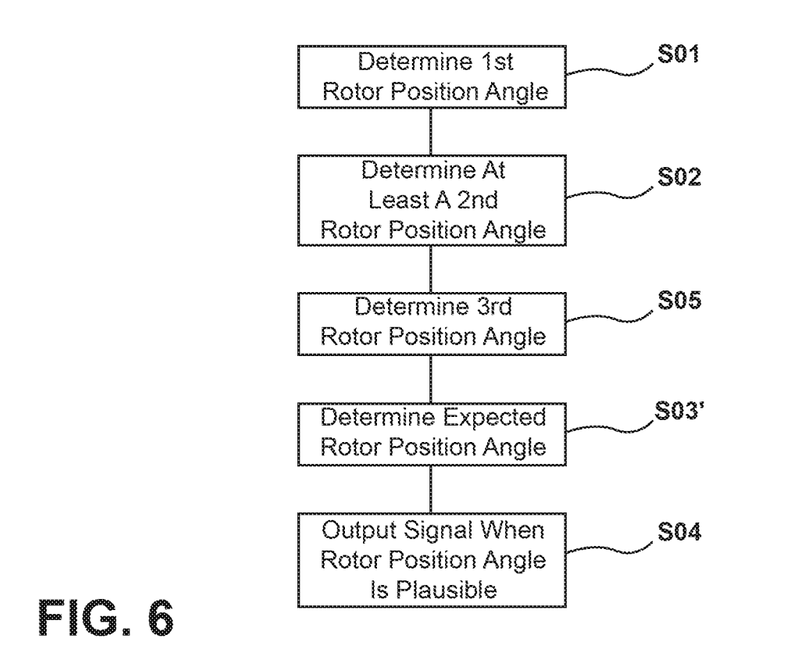
FIG. 6 shows a schematic flow diagram for explaining a method for checking the plausibility of a rotor position angle according to still a further embodiment of the present invention.

FIG. 6 shows as schematic flow diagram for explaining a method for checking the plausibility of a rotor position angle according to still a further embodiment of the present invention.

The method according to FIG. 6 relates to a variant of the method according to FIG. 5, which differs from the latter in step S03' and in an additional step S05.

In step S05, a third rotor position angle $\varphi(t_{k-2})$ is determined at a third time $t_{k-2}$ before the second time $t_{k-1}$. In step S03' the rotor position angle $\varphi_{mod}(t_k)$ expected at first time $t_k$ is determined from the computational model using the second rotor position angle $\varphi(t_{k-1})$ and the third rotor position angle $\varphi(t_{k-2})$.

The computational model, which is used in the method according to FIG. 6, is configured in such a way that the determination S03' of the rotor position angle $\varphi_{mod}(t_k)$ to be expected at the first time from the computational model is based on a difference between the second rotor position angle $\varphi(t_{k-1})$ and the third rotor position angle $\varphi(t_{k-2})$, divided by a difference between the second time, $t_{k-1}$, and the third time, $t_{k-2}$, multiplied by a difference between the first time $t_k$ and the second time $t_{k-1}$.

According to the computation model of the computing device 14, as the rotor position angle $\varphi_{mod}(t_k)$ to be expected at the first time, a sum of the aforementioned difference between the determined second rotor position angle $\varphi(t_{k-1})$ and the determined third rotor position angle $\varphi(t_{k-2})$, divided by a difference between the second time, $t_{k-1}$, and the third time, $t_{k-2}$, multiplied by a difference between the first time, $t_k$, and the second time, $t_{k-1}$, is formed as the first summand. The determined second rotor position angle $\varphi(t_{k-1})$ is likewise formed as the second summand.

That means that:

$$\varphi_{mod}(t_k) = \varphi(t_{k-1}) + \frac{\varphi(tk-1) - \varphi(tk-2)}{tk-1-tk-2}(t_k - t_{k-1}).$$

Thus, the signal 51 is outputted by the plausibility-checking device if:

$$\left|\varphi(tk) - \varphi(tk-1) - \frac{\varphi(tk-1) - \varphi(tk-2)}{tk-1-tk-2}(tk-tk-1)\right| < S$$

Figure 7:
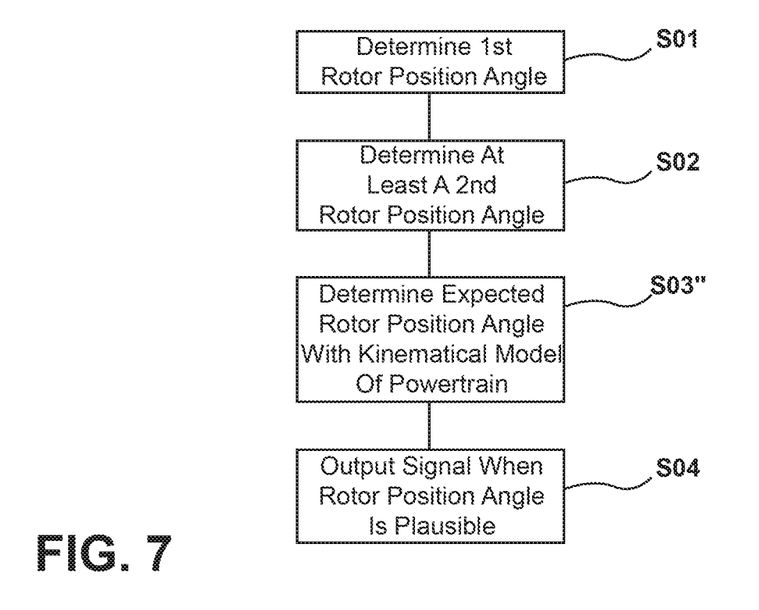
FIG. 7 shows a schematic flow diagram for explaining a method for checking the plausibility of a rotor position angle according to a further embodiment of the present invention.

FIG. 7 shows a schematic flow diagram for explaining a method for checking the plausibility of a rotor position angle according to yet another further embodiment of the present invention.

The method according to FIG. 7 relates to a variant of the method according to FIG. 5, which differs from the same by way of the computational model, which is used to determine the time to be expected at the first time $t_k$. In step S03", which otherwise corresponds to step S03 from FIG. 6, a kinematical model of a powertrain within a Luneberger monitor is used as the computational model.

Figure 8:
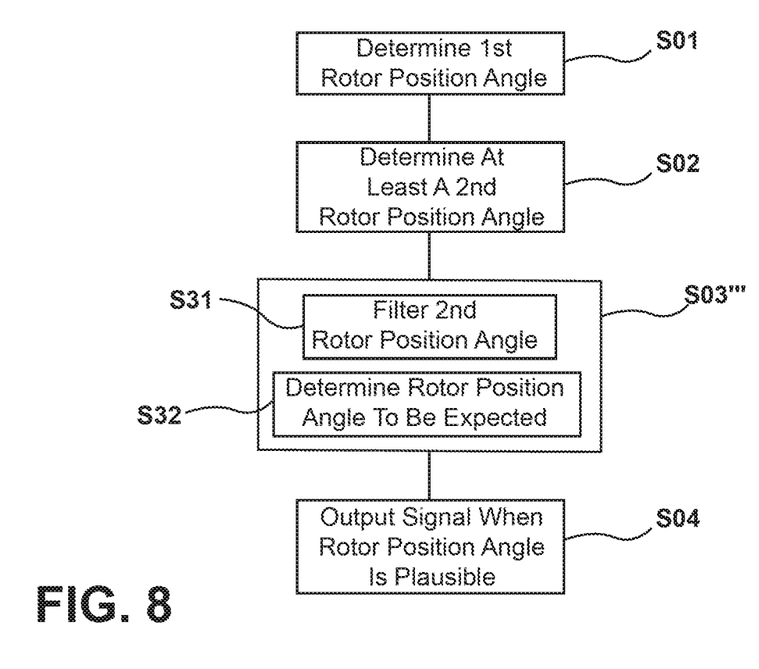
FIG. 8 shows a schematic flow diagram for explaining a method for checking the plausibility of a rotor position angle according to yet a further embodiment of the present invention.

FIG. 8 shows a schematic flow diagram for explaining a method for checking the plausibility of a rotor position angle according to a further embodiment of the present invention.

The method according to FIG. 8 relates to a variant of the method according to FIG. 5. FIG. 8 differs from FIG. 5 in step S03". In step S03", at least the determined second rotor position angle $\varphi(t_{k-1})$ is filtered in a sub-set S31, preferably by means of a state variable filter, particularly preferred comprising a PTn member of the nth order and/or based on state variables. Optionally, the determined first rotor position angle $\varphi(t_k)$ can also be correspondingly filtered before the further processing thereof. A filtered angle signal based on the determined second rotor position angle $\varphi(t_{k-1})$ is generated by the filtering S31 of the determined second rotor position angle $\varphi(t_{k-1})$. In a sub-set S32, the rotor position angle $\varphi_{mod}(t_k)$ to be expected at the first time $t_k$ is determined at least from the generated filtered angle signal by means of the computing model, for example as described in reference to the FIGS. 1 to 7, wherein, instead of the determined second rotor position angle $\varphi(t_{k-1})$, the generated filtered angle signal is always used. In the methods according to FIG. 2 and FIG. 6, the determined third rotor position angle $\varphi(t_{k-2})$, if applicable also each further determined rotor position angle, can likewise, for example, be correspondingly filtered, and a filtered angle signal can in each case replace the determined rotor position angle.

Although the present invention was primarily described using preferred exemplary embodiments, said invention is not limited to said embodiments but can be modified in a plurality of ways. The invention particularly can be changed or modified in a multiplicity of ways without deviating from the essence of the invention.

For example, computation models were described which in each case use the last and/or the second to the last determined rotor position angle for making the plausibility check of a rotor position angle to be determined. It is, however, also conceivable that still further determined rotor position angles that occurred temporally in advance can be used.

The invention claimed is:

1. A control circuit for checking the plausibility of a rotor position angle of a rotor for a machine, comprising:
    a rotor position angle determination device for determining a first rotor position angle of the rotor of the machine at a first time and at least one second rotor position angle of the rotor at a second time before the first time;
    a computing device for determining a rotor position angle to be expected at the first time from a computational model of the computing device using at least the second rotor position angle as an estimate of the first rotor position angle to be determined; and
    a plausibility-checking device for outputting a signal which indicates the determined first rotor position angle as plausible if an amount of a difference between the rotor position angle to be expected and the determined first rotor position angle does not exceed a predetermined threshold value.

2. The control circuit according to claim 1,
    wherein the rotor position angle determination device is designed to determine a third rotor position angle of the rotor at a third time before the second time; and
    wherein the computing device is designed to determine the rotor position angle to be expected at the first time from the computational model using the second rotor position angle and the third rotor position angle.

3. The control circuit according to claim 1,
    wherein the computational model of the computing device comprises a kinematical model of a powertrain within a Luenberger monitor.

4. The control circuit according to claim 1,
    wherein the computing device is designed to determine the rotor position angle to be expected at the first time using a state variable filter, a phase-locked loop, or both.

5. The control circuit according to claim 1, wherein the machine is a synchronous machine for use in hybrid and electric vehicles.

6. A control circuit for checking the plausibility of a rotor position angle of a rotor for a machine, comprising:
    a rotor position angle determination device for determining a first rotor position angle of the rotor of the machine at a first time and at least one second rotor position angle of the rotor at a second time before the first time;
    a computing device for determining a rotor position angle to be expected at the first time from a computational model of the computing device using at least the second rotor position angle; and
    a plausibility-checking device for outputting a signal which indicates the determined first rotor position angle as plausible if an amount of a difference between the rotor position angle to be expected and the determined first rotor position angle does not exceed a predetermined threshold value,
    wherein the rotor position angle determination device is designed to determine a third rotor position angle of the rotor at a third time before the second time;
    wherein the computing device is designed to determine the rotor position angle to be expected at the first time from the computational model using the second rotor position angle and the third rotor position angle; and
    wherein the computational model of the computing device is configured in such a way that the determining of the rotor position angle to be expected at the first time from the computational model is based on a difference between the second rotor position angle and the third rotor position angle divided by a difference between the second time and the third time multiplied by a difference between the first time and the second time.

7. A method for checking the plausibility of a rotor position angle of a rotor for a synchronous machine for use in hybrid and electric vehicles, comprising the steps:
   determining a first rotor position angle of the rotor for the synchronous machine at a first time;
   determining at least one second rotor position angle of the rotor at a second time before the first time;
   determining a rotor position angle to be expected at the first time from a computational model using at least the second rotor position angle as an estimate of the first rotor position angle to be determined; and
   outputting a signal which indicates the determined first rotor position angle as plausible, if an amount of a difference between the rotor position angle to be expected and the determined first rotor position angle does not exceed a predetermined threshold value.

8. The method according to claim 7, comprising the step:
   determining a third rotor position angle at a third time before the second time;
   wherein determining of the rotor position angle to be expected at the first time occurs from the computational model using the second rotor position angle and the third rotor position angle.

9. The method according to claim 8, wherein the computational model is designed in such a way that the determining of the rotor position angle to be expected at the first time from the computational model is based on a difference between the second rotor position angle and the third rotor position angle divided by a difference between the second time and the third time multiplied by a difference between the first time and the second time.

10. The method according to claim 7, wherein a kinematical model of a powertrain within a Luneberger monitor is used as the computational model.

11. The method according to claim 7, wherein the rotor position angle to be expected at the first time is determined using a state variable filter, a phase-locked loop, or both.

12. A control circuit for checking the plausibility of the rotor position angle of a rotor for a synchronous machine according to the method of claim 7.

* * * * *